United States Patent [19]

Miller et al.

[11] Patent Number: 5,784,569
[45] Date of Patent: Jul. 21, 1998

[54] GUARANTEED BANDWIDTH ALLOCATION METHOD IN A COMPUTER SYSTEM FOR INPUT/OUTPUT DATA TRANSFERS

[75] Inventors: Steven C. Miller, Livermore; Jamie Riotto, Montara; James E. Tornes, Menlo Park; Ross G. Werner, Woodside, all of Calif.

[73] Assignee: Silicon Graphics, Inc., Mountain View, Calif.

[21] Appl. No.: 717,581

[22] Filed: Sep. 23, 1996

[51] Int. Cl.$^6$ .................................................. G06F 17/00
[52] U.S. Cl. ............................. 395/200.65; 370/433
[58] Field of Search ........................... 395/200.65, 673; 370/354, 455, 433, 465

[56] References Cited

U.S. PATENT DOCUMENTS

| 4,819,230 | 4/1989 | Calvignac et al. | 370/433 |
| 5,528,513 | 6/1996 | Vaitzblit | 395/673 |
| 5,553,073 | 9/1996 | Barraclough et al. | 370/455 |

FOREIGN PATENT DOCUMENTS

| 0 383 475 A | 8/1990 | European Pat. Off. | G06F 13/364 |
| 0 656 593 A | 6/1995 | European Pat. Off. | G06F 13/362 |
| 0 675 444 A | 10/1995 | European Pat. Off. | G06F 13/36 |
| 0 675 445 | 10/1995 | European Pat. Off. | G06F 13/362 |
| 0 715 261 A | 6/1996 | European Pat. Off. | G06F 13/362 |

Primary Examiner—Ellis B. Ramirez
Attorney, Agent, or Firm—Wagner, Murabito & Hao

[57] ABSTRACT

The present invention discloses a novel arbitration procedure for selecting among devices in a computer system requesting access to a single resource such as, for example, a system bus or main memory. The arbitration procedure provides an efficient means for guaranteeing the available system bus bandwidth to devices having high bandwidth requirements. Each device can be allotted a certain amount of bandwidth that is guaranteed to be available for that device within a given time interval. Excess bandwidth not consumed by the guaranteed allotments can be used as remainder (e.g., available but not guaranteed) bandwidth by the devices. The arbitration procedure further provides a guaranteed maximum latency so that no device is prevented from completing data transfers in a timely manner. The arbitration procedure still further provides the ability to dynamically program the amount of the bandwidth that is guaranteed a particular device. The arbitration procedure can be applied to a number of different communication platforms and bus protocols.

9 Claims, 6 Drawing Sheets

GUARANTEED BANDWIDTH ALLOCATION METHOD IN A COMPUTER SYSTEM FOR INPUT/OUTPUT DATA TRANSFERS

BACKGROUND OF THE INVENTION (1) Field of the Invention.

The present invention relates to procedures for computer system data transmission. More particularly, the present invention relates to transmission of data in a computer system with an improved arbitration method whereby specified devices are allotted guaranteed bandwidths for transmission of time critical data, e.g., graphics information, sound, media, etc.

(2) Background Art.

Multimedia applications, virtual reality, distributed computing and digital video and audio post-production editing or other computer based application programs (collectively referred to hereafter as "digital media applications") require the transfer of vast amounts of digital information as complex images or other data are digitized, manipulated, stored and/or displayed. In many such applications, it is possible that important data will be lost if the computer system is not able to transfer data in a timely manner. Also, in instances when multiple data transmissions (data streams) need to be transmitted in synchronization with each other (e.g., audio and video in a media reproduction), it is possible that the information can be received out of synchronization if transmission bottlenecks occur. Alternatively, if transmission is unexpectedly delayed, the quality of real-time media reproduction (e.g., video and/or sound) can be degraded and image stuttering can occur. It shall be understood that the phrase "digital media applications" as used herein shall include any software program or application having data transmission requirements that cannot tolerate a high degree of latency such as three dimensional architectural modeling, volumetric rendering for oil or mineral exploration, medical imaging applications, database applications with high transactional rates or video on demand server and the like. Latency is a term used to define the amount of time (e.g., the stall time) a device, having data transmission requirements, must wait before it is granted bus access. During the stall time, devices must be able to buffer the data that is to be transferred until bus access is obtained.

Due to recent advancements, central processing unit (CPU) performance specifications for desktop computer systems are adequate for supporting the operating requirements of one digital media application. However, as is understood by those skilled in the art, data may be lost, or certain transmission reproductions can be degraded, if a device with high bandwidth requirements is not granted access to the system bus in a timely manner. As is well understood in the art, each computer system implements a bus arbitration procedure to determine the manner in which devices, installed on the system bus, gain bus access for the transmission of data. If the arbitration procedure is not sufficiently flexible or adaptable to changing data transmission requirements, high bandwidth devices may not have sufficient buffer storage to retain data waiting to be transferred in which case data may be lost. This is particularly true of some input/output devices that supply information in unexpected amounts, e.g., a graphics unit that has a random access pattern and has a high demand for data, or when large data transfers are switching between alternate devices which for brief periods of time may need a substantial portion of the available bandwidth. Loss of data is especially common when one or more digital media applications are running and generating large amounts of real-time data.

One arbitration procedure allocates 1/N of the system bandwidth to each device requesting access to the system bus where N is the number of requesting devices. However, this type of arbitration procedure is inadequate where one or two digital media applications having high bandwidth requirements are present together with additional devices having low bandwidth requirements. If a device has real-time data that must be transmitted in a timely manner, it is inefficient to permit the low bandwidth devices to consume significant portions of the available bandwidth.

To minimize the loss of real-time data, high bandwidth devices should be able to buffer the data for the time other devices control the system bus. However, adding sufficient buffers to store the data generated by digital media applications is relatively expensive and may not be sufficient to prevent loss or degradation of real-time data as more and more devices are added to the system bus. As will be appreciated, such arbitration procedures risk the loss of real-time data, while a low priority device (for example, a printer with non-real-time transmission requirements) is being serviced because each device has an equal amount of the available bandwidth.

Other arbitration procedures recognize that real-time devices must have high priority access to the system bus to ensure timely transmission. However, arbitration procedures that prioritize one device over others are inefficient since the assigned priority does not adjust optimally in response to changes in bus loading. Under such arbitration procedures, it is possible for a high priority device to block access to the system bus and thereby prevent lower priority devices from gaining bus access.

Also, prior art arbitration procedures commonly result in devices colliding as two or more devices attempt to simultaneously gain access to the system bus. In many instances, high bandwidth devices are prevented from transferring data in a timely manner when other devices gain control of the bus. When device transmission requests collide, each must wait a short period before again attempting to access the bus. However, upon retry, bus access rights may have been granted to another device thereby causing further delay before the high bandwidth device can transfer its data.

In addition, it is not sufficient merely to dynamically adjust the arbitration in favor of the device needing the most transfer bandwidth. Many devices have "spotty" or irregular transfer requirements. Allocating enough bandwidth to cover peak device needs will waste usable bandwidth when that device's needs fall below peak.

Accordingly, it is desirable to have an arbitration procedure that efficiently allocates the bus resources of a computer system among both high priority devices and low priority devices and that is dynamically adjustable to meet changing demands on the computer systems' communication resources. The present invention provides the above advantages.

SUMMARY OF THE INVENTION

To overcome the limitations in the prior art described above, and to overcome other limitations in the prior art that will become apparent upon reading and understanding this specification, the present invention discloses a novel arbitration procedure for selecting among devices in a computer system requesting access to a single resource such as, for example, a system bus. The arbitration procedure provides an efficient means for guaranteeing the available system bus bandwidth to devices having high bandwidth requirements. In one embodiment, each device is allotted a certain amount of communication bandwidth that is guaranteed to be available within a given time frame. The arbitration procedure further provides a guaranteed maximum latency so that no device is prevented from completing data transfers in a timely manner. The arbitration procedure still further provides the ability to dynamically program the amount of the bandwidth that is guaranteed a particular device.

More specifically, the present invention divides the bandwidth into a plurality of transmission cycles. Each transmission cycle is further divided into a plurality of time slices which are allocated in response to the transmission requirements of active devices. Devices having real-time transmission requirements are guaranteed the opportunity to send data at a rate sufficient to meet their bandwidth requirement of the device. Specifically, each device having real-time data transmission requests is assigned to a guaranteed bandwidth ring and is sequentially selected in round robin fashion. Once selected, the device may transmit data for the duration of one time slice. Devices having high bandwidth requirements may be allocated additional time slices during each transmission cycle.

In the event there are unused time slices in a particular transmission cycle, a second level of arbitration is provided for the transmission of data from devices whose transmission requirements exceed the allocated number of time slices or from devices that can tolerate a high degree of latency. Devices subject to the second level of arbitration are assigned to a remainder ring and selected in round robin fashion. The second level of arbitration permits the selected device to transfer data for a period of time comprising one or, alternatively, a plurality of consecutive time slices. When the transferring device has no additional data requests, the next device is selected in sequential order until the number of time slices in the transmission cycle are exhausted or no device on the remainder ring has an outstanding transmission request. The number of consecutive time slices granted to each device on the remainder ring is programmable and is reloaded for each transmission cycle.

The present invention provides a number of advantages over other arbitration procedures for enabling peer to peer data transfer because the round robin arbitration procedure prevents collision of transmission requests and ensures that all devices will be serviced according to the priority of the data. Additional advantages to the present invention will become apparent upon reading and understanding this specification.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. Wherever possible, the same reference numbers will be used throughout the drawings to refer to the same or like parts. Numerous specific details are set forth in order to provide a thorough understanding of the present invention. However, it will be obvious to one skilled in the art that the present invention may be practiced without these specific details or with certain alternative equivalent circuits and methods to those described herein. In other instances, well known methods, procedures, components, and circuits have not been described in detail as not to unnecessarily obscure aspects of the present invention.

Before the specifics of the data transmission arbitration procedure of the present invention are described, an exemplary computer system platform is presented below.

EXEMPLARY COMPUTER SYSTEM

Figure 1:
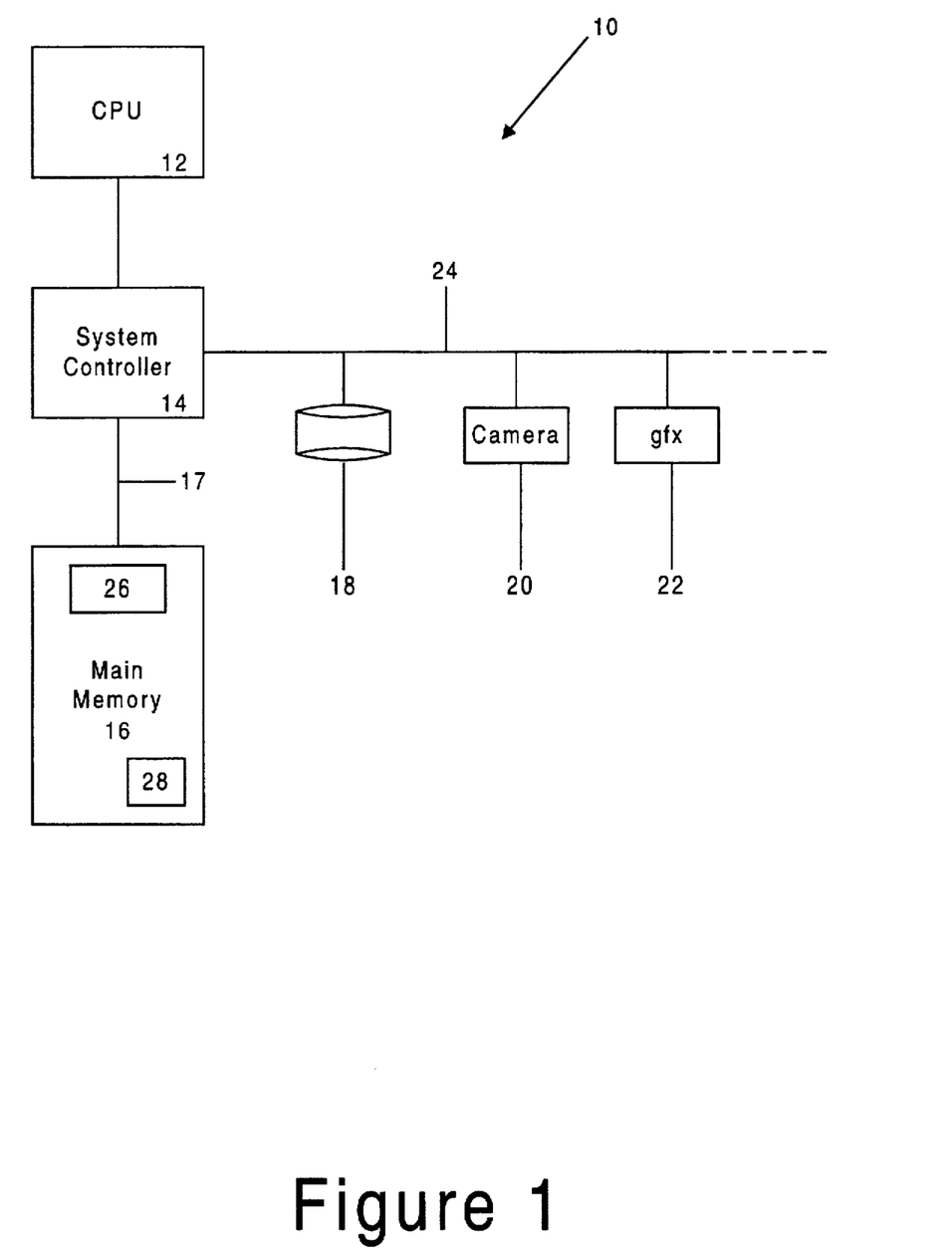
FIG. 1 shows a functional block diagram of a computer system.

Referring to the drawings more particularly by reference numbers, a functional configuration of an exemplary computer system 10 for operating digital media applications is shown in FIG. 1. Although the present invention arbitration procedure is well suited for a number of different computer configurations, system 10 is shown as an example to describe aspects of the present invention arbitration procedure. Computer system 10 can comprise a processor (CPU) 12 connected by system controller 14 to main memory 16 by a main bus 17. System controller 14 is also coupled by system address/data bus 24 to a plurality of peripherals or devices such as a disk drive array 18, real-time digital video camera 20 and a graphics display terminal 22. Although not shown, it will be understood by persons of ordinary skills in the art that computer system 10 includes numerous devices not shown in FIG. 1 for the sake of clarity, such devices can include additional disk drives, input devices such as a keyboards or mouse, network connections, additional memory, additional processors, etc. It will also be understood that throughout the remainder of this detailed description, the term "device" shall hereinafter include the devices not explicitly shown in FIG. 1.

As is well understood in the art, an operating system 26 is generally resident in main memory 16 during operation of CPU 12 and device drivers 28, also resident in main memory 16, are associated with each device 18–22. Whenever an application program is loaded into main memory 16 and initialized, a request procedure issues a guarantee bandwidth request for the devices that will be invoked by the application program. Operating system 26 receives the requests and attempts to allocate the available bandwidth in accordance with the device requests. When there are more requests from active devices for more than the available bandwidth, operating system 26 can issue a message advising the user that the application will run with less than the requested bandwidth allocation, or alternatively, a program suspense with error can result.

DATA TRANSMISSION ARBITRATION OF THE PRESENT INVENTION

Figure 2A:
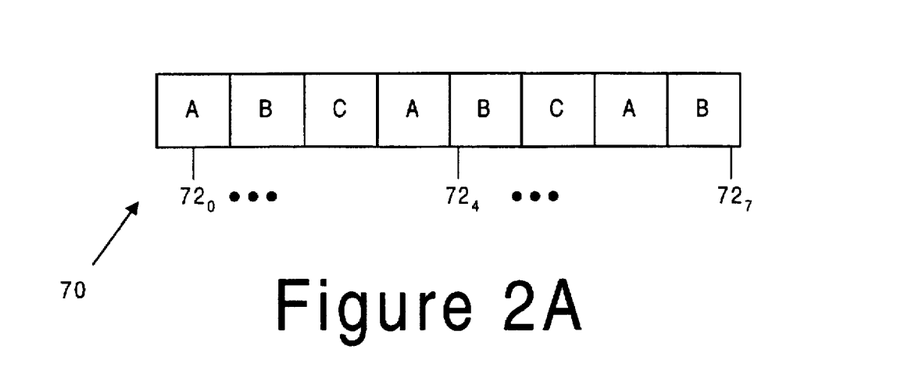
FIG. 2A, FIG. 2B and FIG. 2C show representations of transmission cycles with time slices allocated among three devices on the guaranteed bandwidth ring in accordance with the present invention.

The present invention allocates the available bandwidth in a series of transmission cycles 70, one of which is shown in FIG. 2A. The duration of transmission cycle 70 may be selected by the operating system 26. Each transmission cycle 70 comprises a plurality of time slices $72_0$ to $72_n$ (collectively referred to as "time slices 72," 0–7 of which are shown in FIG. 2A as an example). Each time slice 72 preferably comprises a duration of 180 nanoseconds (0.18× 10-6 seconds in one embodiment) during which time one of devices 14, or 18–22 (FIG. 1) may be granted control of system bus 24. It is appreciated that within the scope of the present invention, the duration of time slices $72_{0-n}$ may be selectively matched to operating requirements of computer system 10. For example, if computer system 10 operates with a 200 Mhz system clock, time slices may be set as a multiple of 5 nanoseconds with a duration sufficient to allow for address decoding and handshaking and a period of time for transmission of data.

Figure 2B:
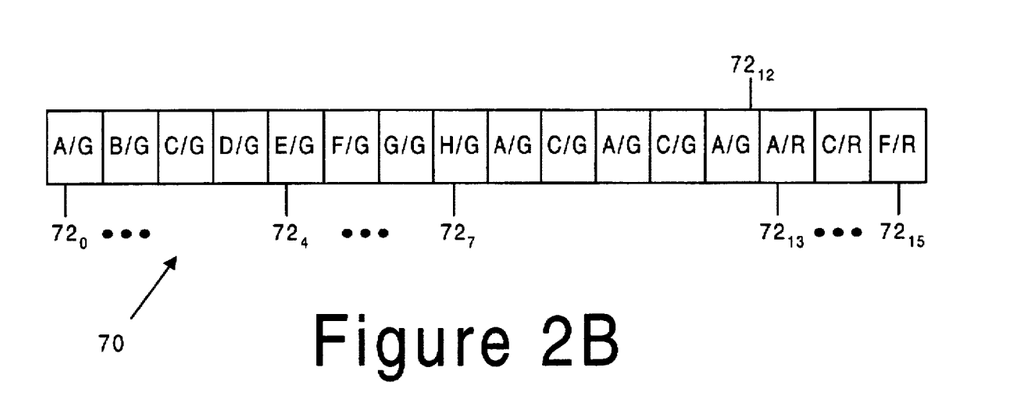

Transmission cycle 70, as shown in FIG. 2A, represents a time frame and comprises eight time slices with an overall predetermined duration (or granularity). FIG. 2A shows not only the time slice but also the device name (A-C) to which the slice is allotted. In one embodiment of the present invention a transmission cycle duration of 1.4 microsecond (1.4 us) is used, however, the present invention is well suited for larger or smaller individual transmission cycle durations. The value of 1.4 is arrived at eight instances (e.g., time slices) of 180 ns. Another exemplary transmission cycle 70 is represented in FIG. 2B with sixteen time slices 72 (each 180 ns in duration) and a duration of 2.8 microsecond (2.8 us). As will be appreciated, as the number of time slices 72 is increased, the duration of the transmission cycle also increases if the duration of each time slice is held constant.

If eight devices A-H are requesting access to system bus 24, each time slot 72 will be allocated to a different device with each device having 180 ns tenure on the bus in which to transfer a burst of data. When each device requests no more than one time slice per transmission cycle, the remaining eight time slices, that is time slices $72_8$ to $72_{15}$, in the transmission cycle 70 are unused. With the present invention, however, it is possible to grant high bandwidth devices, such as, for example, a digital video camera or graphic terminal, a greater proportion of the available bandwidth relative to the other coupled devices. Accordingly, it is possible that one of more of the devices will be granted additional time slices during each transmission cycle.

As shown in FIG. 2B, devices A-H are each granted one time slice at the start of transmission cycle 70 for a guaranteed bandwidth transmission. Each device has a guaranteed bandwidth count value greater than zero. The first letter of each time slice $72_n$ represents the device name and the second letter represents the ring where "G" is the guaranteed bandwidth ring 82 and "R" is the remainder ring 84. Devices A and C, which may have higher bandwidth requirements, are allocated time slices $72_8$ to $72_{12}$ with time slices $72_{13}$ to 7215 left unused (e.g., reserved), as shown by the "R" designation. Since the number of time slices in each transmission cycle 70 is programmable within the present invention, it is possible for the arbitration system to dynamically adapt to bus usage by varying bandwidth granularity in response to the number of active devices having high bandwidth requirements. In effect, the present invention can also build in a determined number of "R" time slices not allocated for the guaranteed bandwidth ring 82 but are available for the remainder ring 84. Table 1 discloses possible granularity of the bandwidth based on the number of time slices 72 comprising each transmission cycle 70 in accordance with one preferred embodiment of the present invention.

TABLE 1

| BANDWIDTH GRANULARITY | | |
|---|---|---|
| Number of Time Slices per Transmission Cycle (Reload Value) | Time Interval | Amount of Bandwidth per Timeslice (Granularity) |
| 8 | 1.4 us | 50.000 MBytes/sec. |
| 16 | 2.8 us | 25.000 MBytes/sec. |
| 32 | 5.7 us | 12.500 MBytes/sec. |
| 64 | 11.5 us | 6.250 MBytes/sec. |
| 128 | 23.0 us | 3.125 MBytes/sec. |
| 256 | 46.0 us | 1.500 MBytes/sec. |
| 512 | 92.2 us | 0.750 MBytes/sec. |

As shown in the middle column of Table 1, the duration of each transmission cycle 70 increases from 1.4 us to 92.2 us as the number of time slices 72 (e.g., "reload value") increases from 8 to 512. The granularity, as shown in the third column of Table 2, is based on a system bandwidth capable of support data transmission at a rate of 400 Mbytes/ second over system bus 24 (FIG. 1) and represents the average effective bandwidth per time slice available to a device. Accordingly, as the Reload Value increases (e.g., as the number of time slices in a transmission cycle increases), the amount of time spent at the instantaneous bandwidth limit may increase for a device but the period of time between consecutive bus accesses also increases. Although the reload values shown in Table I are implemented in powers of 2, they are exemplary and alternate implementations are equally suitable within the scope of the present invention.

As will be appreciated by one skilled in the art, high bandwidth devices may need to buffer significant amounts of data between consecutive bus accesses as the transmission cycle increases in duration. Table 2 summarizes typical buffer requirements for a device that has requested the amount of bandwidth set forth in the first column for a given reload value (columns 2–5). A buffer is the amount of data that can be transferred in a time slice, e.g., in one embodiment the buffer is 128 bytes. However, the buffer requirements are determinable since it is possible to guarantee the time between consecutive bus access for high priority devices, which is not the case for prior art schemes. By way of example, a device requesting 30% of the system bandwidth will require about 62 buffers if the Reload Value is 512 while less than 20 buffers are required if the Reload Value is 64 or less. Each buffer needs to provide sufficient storage for data equivalent to the burst transmission rate supported by the system bus during a time slice 72.

TABLE 2

| Buffer Requirements for Peripheral Devices | | | | |
|---|---|---|---|---|
| Requested Bandwidth | Reload Value 512 | Reload Value 256 | Reload Value 128 | Reload Value 64 |
| 30% | 62 | 45 | 30 | <20 |
| 50% | 95 | 70 | 60 | <20 |
| 70% | 90 | 62 | 40 | <20 |
| 90% | 40 | 30 | 20 | <20 |

Figure 3:
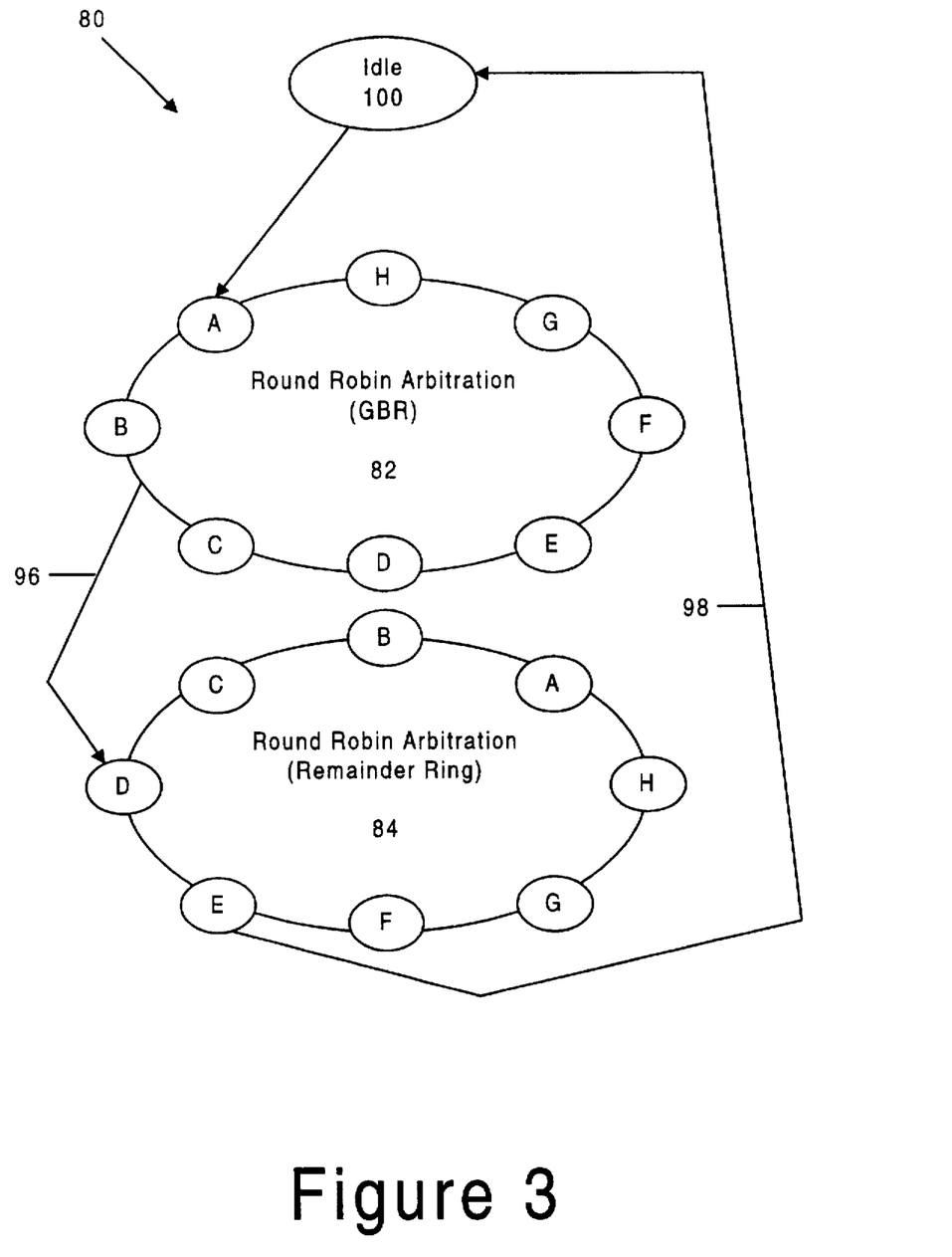
FIG. 3 represents an arbitration diagram depicting the arbitration procedure of the present invention.

Referring to FIG. 3, the selection of which device and which device's data transmissions are allotted to communicate over the communication path 24 and when is determined by the arbitration procedure 80 of the present invention. The arbitration procedure 80 of the present invention supports a dual priority arbitration procedure that guarantees bandwidth to high priority data with a reasonable maximum latency for lower priority devices so as to reduce the need for large amounts of buffering. It is appreciated that the present system is a prioritization procedure rather than a reservation procedure so that low priority devices are not locked out from transferring data by higher priority devices. Under this procedure, devices on a high priority arbitration ring 82 (referred to hereafter as the guaranteed bandwidth ring or "GBR") will be transferred before a device on a normal priority ring 84 (referred to hereafter as the remainder ring or "RR") is granted bus access.

On GBR 82, the arbitration procedure of the present invention utilizes a round robin fairness procedure permitting each device A-H to gain bus access and transmit data for one time slice 72. After an initial device is selected, the next device is processed depending on its evaluation position within the round robin framework. Devices on the GBR 82 are serviced in round robin order starting at one greater than the last device that won arbitration in the previous transmission cycle 70. In this manner, "collisions" between two or more devices trying to gain access to the bus is prevented. In this framework, the maximum stall time before a device may transmit a burst of data on GBR 82 is equal to one less than the number of requesting devices. The arbitration procedure of the present invention guarantees a worst case average latency by bounding the maximum amount of data that may be sent by other devices sharing system bus 24 before transmission commences.

Arbitration on the RR ring 84 is similarly granted within a modified round robin framework (described further below). In general, ring 82 is provided to process all of the guaranteed bandwidth data allotted to the devices for a given time interval and ring 84 is provided to process all of the remainder data (e.g., not guaranteed bandwidth) within a given time interval. It is possible that no remainder time is available after GBR ring 82 transmissions complete.

Referring again to FIG. 2A, devices with high bandwidth requirements may request a greater proportion of the available bandwidth. By way of example, assume that devices A and B each request allocation of three time slices 72 during each transmission cycle 70 while device C, which has lower bandwidth requirements, requests allocation of two slices 72. For purposes of this example, devices D-H have either not requested GBR priority or are not active.

At the beginning of each transmission cycle 70, the round robin arbitration scheme of the present invention sequentially selects devices A, B and C, each of which is granted one time slice 72 to transmit data. Accordingly, device A controls bus 24 during time slice $72_1$ and devices B and C are granted control during time slices $72_2$ and $72_3$, respectively. Since there are remaining time slices available, the round robin arbitration is repeated with devices A, B and C each being granted an addition time slice, that is, time slices $72_4$–$72_6$. During the next round robin cycle, device C is no longer permitted to participate so only devices A and B participate for the duration of the current transmission cycle 70.

The arbitration procedure 80 is able to accommodate additional devices by changing the number of timeslices 72 in the transmission cycle 70. Specifically, referring again to FIG. 2B, if devices A-H request bus access, the arbitration procedure 80 grants each device a percentage of the bandwidth in accordance with requests presented by the device driver 28 associated with each device which, by way of example, may be one time slot for devices B and D-H, three time slots for device C and four time slots for device A. The unused time slots of a time interval would be available for devices with low bandwidth requirements as described below (e.g., ring 84). In accordance with the round robin arbitration of the present invention, device A is selected and granted bus access for time slice $72_1$, device B is then selected and granted bus access for time slice $72_2$. The selection and granting bus access continues until each device C-H have completed data transmission during time slots $72_3$–$72_7$, respectively. Since there are remaining time slots in the current transmission cycle 70, the round robin arbitration 80 repeats the selection process. However, since only devices A and C have allocated time slots, the round robin selection is only between these two devices. Once devices A and C have exhausted the allocated time slots or have no further transmission requirements, whichever is the first to occur, devices B and D-H may transmit any additional data on the remainder ring 84.

Referring again to FIG. 3, the remainder ring 84 is a second level of arbitration for devices having data to transmit in excess of the time slots granted under the present arbitration procedure or for devices that can tolerate a higher degree of latency. Devices that do not have GBR priority, participate on the remainder ring 84 and share any remaining timeslices not used by devices on GBR 82 during each transmission cycle 70. Requests from the remainder ring devices are only serviced if there are no conflicts with the requests from the GBR as indicated at 96 in FIG. 3.

Figure 2C:
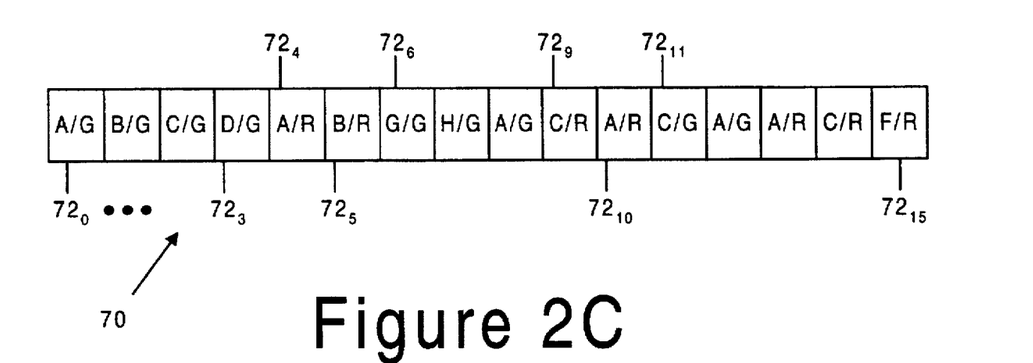

Furthermore, GBR requests can be inserted in the middle of a remainder ring bus tenure when the remainder ring 82 is issuing multiple data transmissions during its tenure. This is shown by the transmission cycle of FIG. 2C. In effect, while in the RR ring 84, a GBR data transmission (e.g., time slice $72_6$ or $72_{11}$) can be requested by a device having a non-zero GBR value; the remainder ring bus tenure is then interrupted. In this instance, transmissions on the RR ring 84 are suspended at the completion of any in progress transmissions and the GBR data is transmitted next. If no further GBR data requests are present within the current transmission cycle, processing returns to the RR ring 84 (e.g., $72_9$) to continue any valid suspended remainder ring transmissions. As processing "flips" from GBR ring 82 to the RR ring 84, the round robin transmission order of the devices is maintained from the last time processing was active on that ring.

Arbitration within RR 84 utilizes a Remainder Weight Arbitration procedure which is a modified variant of the round-robin arbitration procedure used on GBR 82. Specifically, each device is assigned a remainder weight value of between 1 and n (where n=8 in the preferred embodiment) when the device driver 28 is installed. The remainder weight value is used by the arbitrator to determine the number of consecutive time slices allowed before the next requesting device is granted bus access.

The remainder weight value is a burst count that allows the selected device to use up to n-consecutive time slices (e.g., data transfer data bursts) before it has to give up bus 24 to another remainder ring requester. Once a device wins bus access, a counter containing the remainder weight value is decremented each time a time slice is used (e.g., a data burst is transmitted). This device will continue to win subsequent arbitration requests provided it is not preempted by a GBR arbitration request and it has not exceeded its remainder weight value (that is, the counter value is decremented to zero). Priority will remain with the device until one of two conditions occur. The first condition occurs if the remainder weight counter value reaches zero, or some other selected threshold value, in which event priority is passed to the next requesting device on the remainder ring. The second condition occurs when the device does not re-request connection.

If a GBR 82 arbitration request interrupts a device transmitting data on RR 84, priority is returned when the remainder ring is next granted bus access rights. In other words, after the GBR request has completed, the device will complete its n-time slice (e.g., data burst) transmission before the next device on RR 84 is selected. If no devices on RR 84, or GBR 82, have pending data transmission requests, system controller 14 will idle, as indicated at idle state 100.

Figure 4:
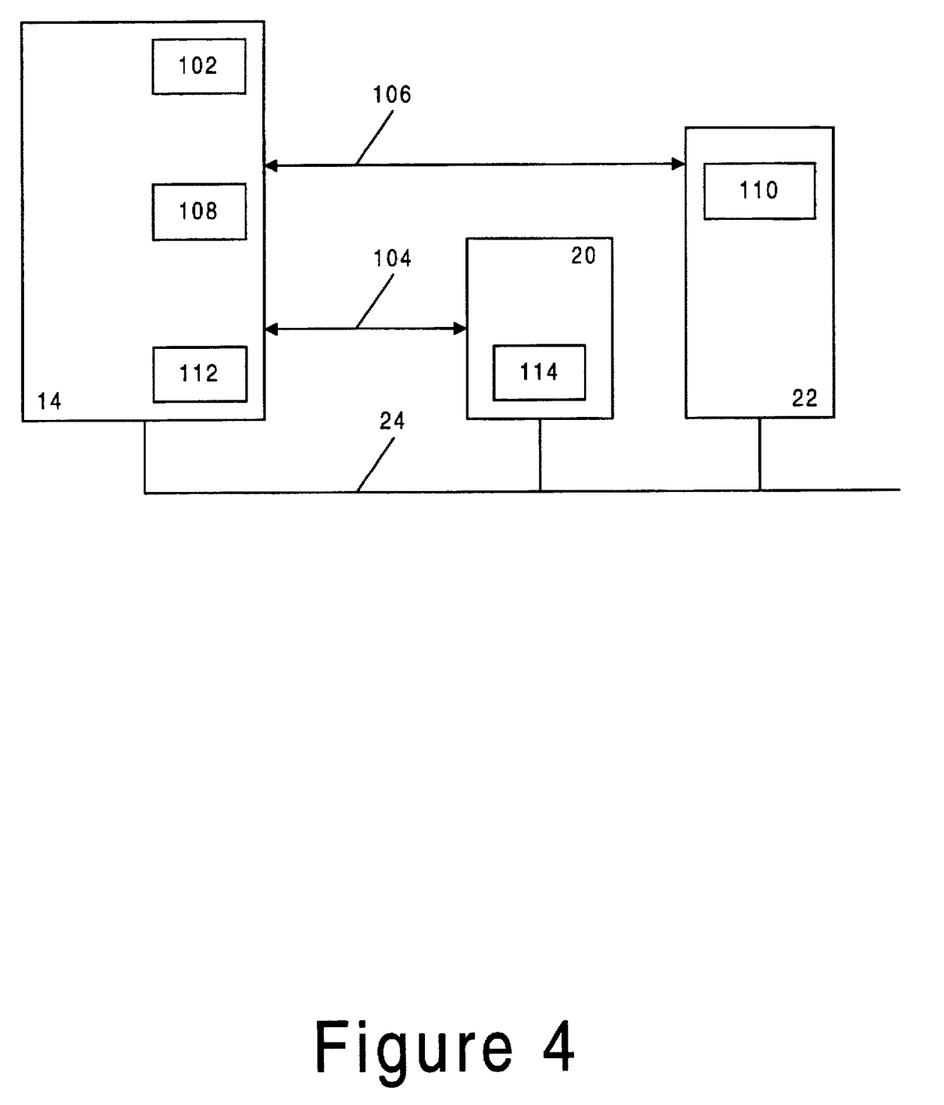
FIG. 4 shows a more detailed functional block diagram of the computer system of FIG. 1.

An example is now presented regarding other detailed aspects of the operation of procedure 80 of the present invention. Referring to FIG. 4, system controller 14 and two devices are shown, by way of example, which are camera 20 and display 22, each having high bandwidth requirements. Other devices are not shown but may be present on bus 24. System controller 14 comprises system arbiter 102 which provides the logic for implementing the arbitration procedure of the present invention. Included in the logic is a programmable value corresponding to the Reload Value which determines the number of time slices 72 that comprise each transmission cycle 70. During initialization of computer system 10 (FIG. 1) the system controller interrogates each device to determine an appropriate Bandwidth Counter value for each device installed on bus 24 and sets a default Reload Value.

The Bandwidth Counter values are held in registers associated with each device. Register 112 corresponds to camera 20 and register 108 corresponds to display 22. Registers 108 and 112 are preferably "count down" registers with the Bandwidth Counter value loaded at the beginning of each transmission cycle. When the value in these registers reach zero (or a selected value) the corresponding device is dropped from the GBR 82 round robin arbitration. If a device does not require guaranteed bandwidth, its Bandwidth Counter value is reloaded at the start of each transmission cycle with a zero.

When a device has a Bandwidth Counter value of zero, transmission priority for that device falls to the remainder ring 84. Requests from the remainder ring are only processed if there are no conflicts with requests for GBR 82. As noted above, the Remainder Weight value determines the number of consecutive data transmission bursts that may be sent when a device is selected on RR 84. In FIG. 4, the Remainder Weight value for camera 20 is held in register 114 and for display 22 in register 110. Registers 110 and 114 are a part of the respective device but they may be provided as a part of system controller 14 in other embodiments. When a device on RR 84 (FIG. 3) is granted bus access, it retains remainder ring priority until it has either completed its transmission or until its Remainder Weight value is exceeded.

It is possible for a device to dynamically request adjustment to either the Bandwidth Counter value or the Remainder Weight value in response to new application programs being activated or in response to increased transmission requirements. It is also possible for a device with extremely critical bandwidth requirements to request two or more consecutive time slots each time the device is selected. Such requests are transmitted between devices and system controller 14 on a command bus. As shown in FIG. 4, command bus 104 couples camera 20 to system controller 14 and command bus 106 couples display 22 to system controller 14.

When system controller 14 of FIG. 4 receives requests for changing the Bandwidth Counter or the Remainder Weight values, the system controller 14 must determine the maximum number of devices requesting bus access. For example, with eight devices each requesting one time slot per transmission cycle, system controller will select a Reload Value of eight. If each these eight devices requested two time slots, system controller 14 would select a Reload Value of 16. In general, as bus access requests increase, so to does the Reload Value. The Reload Value has a lower bound determined in accordance with relation (1).

$$\text{Reload Value} \geq \sum_{i=1}^{\text{\# of ports}} GBR \text{ Allotted Time Slices}(i) \qquad (1)$$

Figure 5:
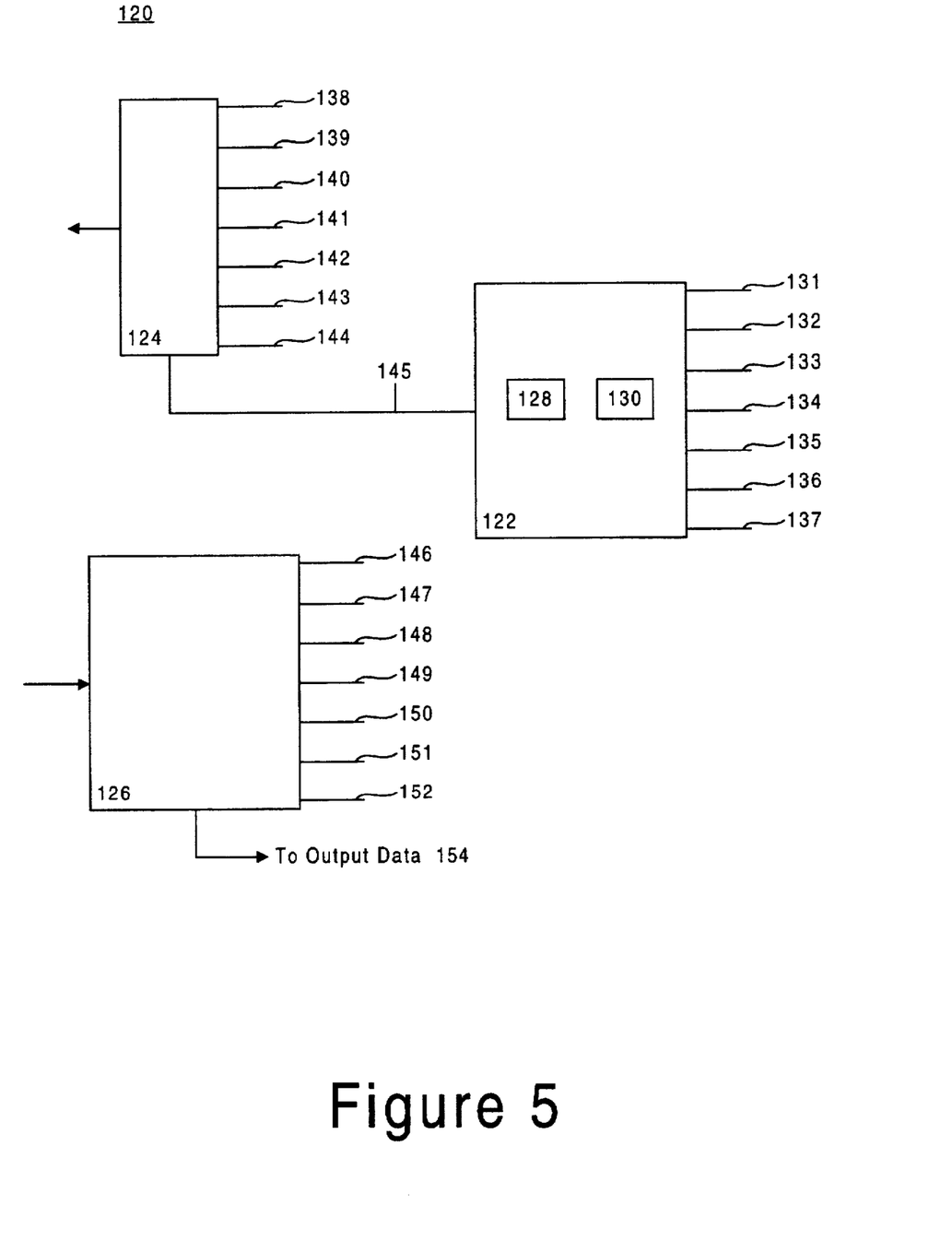
FIG. 5 shows a functional block diagram of a portion of an exemplary computer system incorporating a crossbar interconnect.

Referring now to FIG. 5, another exemplary platform is shown. The arbitration procedure 80 of the present invention may also be used in conjunction with a crossbar system interconnect such as described in greater detail in the copending United States patent application entitled SWITCHED BUS ARCHITECTURE FOR PROVIDING MULTIPLE SIMULTANEOUS COMMUNICATIONS, Ser. No. 717,580, attorney docket number SGI-15-4-413.00, filed on Sep. 23, 1996, and assigned to the assignee of the present invention, the disclosure of which is incorporated herein by reference. The crossbar interconnect is a packet switched interconnect which transfers packets of information via a split transaction protocol. In the preferred embodiment, the crossbar interconnect includes eight ports, each of which is configured in a similar manner to port 120. Port 120 includes a crossbar arbitrator 122, a 7:1 output multiplexer 124 and an input port buffer 126. Arbiter 122 includes registers 128 and 130 which contain the Bandwidth Counter value and the Remainder Weight Value, respectively, associated with the respective port.

When data is received at input port buffer 126 of FIG. 5, circuit logic associated with the input port buffer 126 issues a request to one of seven arbiters that corresponds to a destination port which is one of seven possible destination ports. Similarly, when another port is attempting to transfer data to the output mulitplexer 124 of port 120, arbiter 122 arbitrates among the competing input buffers that wish to send data and selects the winning output data line 138–144 at output mulitplexer 124 of port 120. It will be appreciated that in this embodiment, arbiter 122 arbitrates for use of the target output port rather than for use of a system bus. Accordingly, arbiter 122 receives GBR and RR requests and grants requests, when arbiter 122 is the target output port, on busses 131–137. Similarly, when input buffer 126 has data that is targeted for a specific output buffer, it sends GBR and RR requests on busses 146–152 to the corresponding arbiter. Once rights to the output buffer are won, the input buffer transfers data on the output data line 154.

Figure 6:
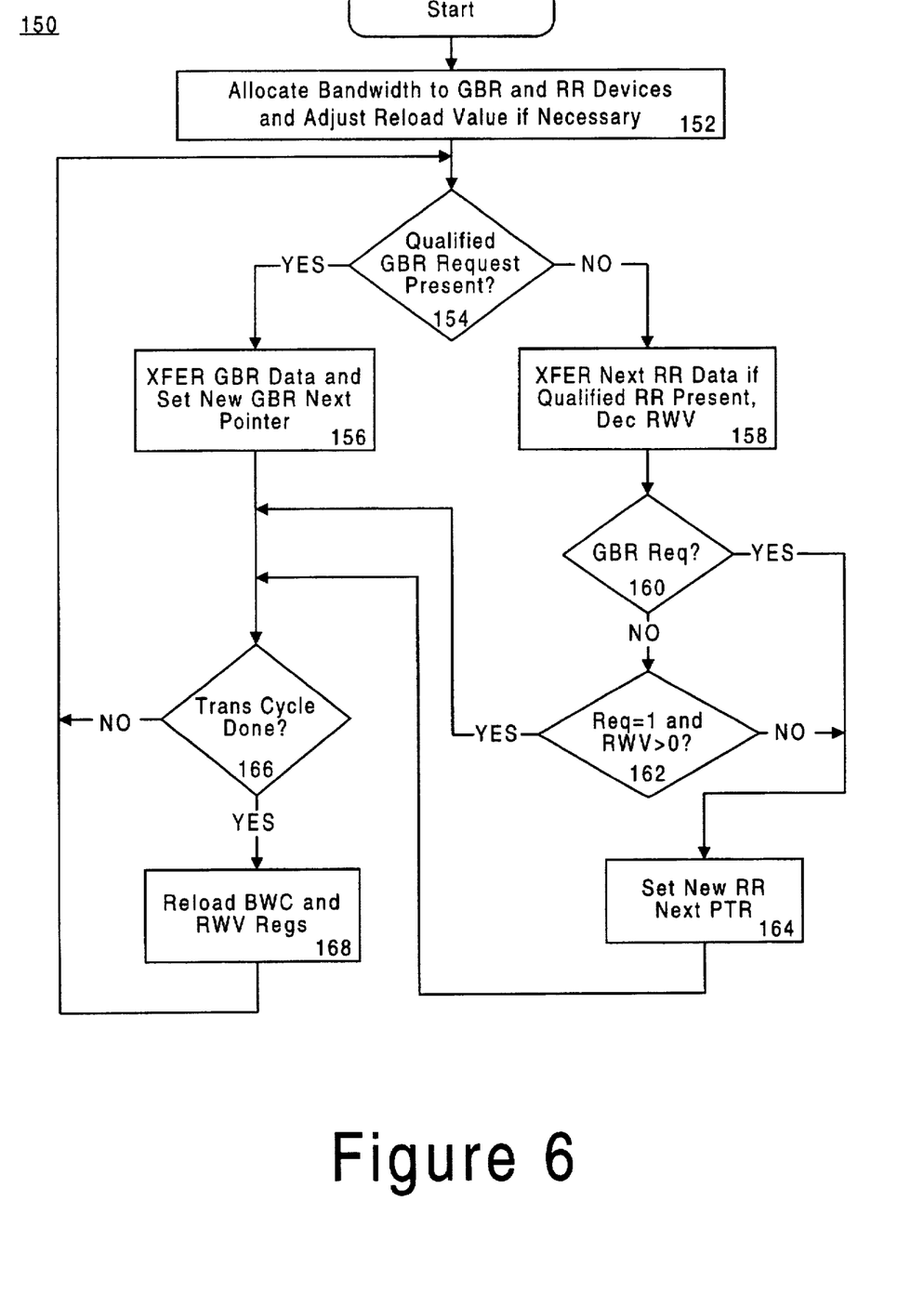
FIG. 6 is a flow diagram of steps of one embodiment of the arbitration procedure of the present invention.

Referring now to FIG. 6, the arbitration procedure 150 of the present invention permits high bandwidth devices to be allocated a guaranteed percentage of the bandwidth as determined by the operating system software in step 152. Also at step 152, the number of time slots in a transmission cycle 70 and the number of time slots allocated to each device is programmable. A GBR reload value is set for each device at step 152. The high bandwidth devices are assigned to GBR 82 and may obtain one or more time slices during each transmission cycle. Worst case latency is determined by the number of devices assigned to GBR and is not dependent on the data transmission requirements of other devices on the bus. At step 154, process 150 checks if a qualified (e.g., the device's GBR count value is greater than zero) GBR request is present for a respective device in round robin order. If so, flow continues to step 156, else process 150 flows to step 158. At step 154, process 150 selects the sequentially next device in the round robin order. The sequentially next device selected is based on the round robin ordering that starts based on a GBR next pointer value.

At step 156, the device having the qualified GBR request is allowed to transmit its GBR data over the communication path consuming one time slice 72. At step 156, the GBR count value is then decremented by one for the respective device identified at step 154. Also at step 156, the new GBR next pointer is set according to the round robin order. At step 166, process 150 checks if the transmission cycle 70 is complete. If not, then step 154 is entered again. Steps 154, 156, and 166 provide a pathway ("GBR loop") for sequential GBR transmissions within the GBR ring 82 for a given transmission cycle.

At step 166, if the transmission cycle 70 is done, then the GBR bandwidth counters (BWC) for each device and the remainder weight counter (RWV) are reloaded to enter a new transmission cycle 70. Step 154 is then entered. Therefore, At the end of each transmission cycle 70, the Bandwidth Counter value and Remainder Weight value are reloaded and the process repeated, as indicated at step 168.

At step 154, if a GBR request is not present, then the second priority ring, RR 84, is allowed to send data. The RR ring 84 allows uneven distribution of the remaining bandwidth (e.g., unallocated time slots or allocated time slots that have not been used) among the devices having low priority communication requirements or devices that have data to transfer in excess of its GBR allocation. At step 158, process 150 checks if a qualified (e.g., the device's RWV count value is greater than zero) RR request is present for a respective device in round robin order. If so, at step 158, the device having the qualified RR request is allowed to transmit its RR data over the communication path consuming one time slice 72. At step 158, process 150 selects the sequentially next device in RR ring 84 in the modified round robin order. The sequentially next device selected is based on the round robin ordering that starts based on a RR next pointer value. Also at step 158, the remainder weight value is decremented.

At step 160, if a GBR request is then received, then processing flows to step 164 where the RR ring 84 is exited and where a new RR next pointer is set in order to re-enter the RR ring 84 properly again. Step 166 is then entered. At step 160, if a GBR request is not received and a request for another RR is present and the remainder weight value is greater than zero for the device, then process 166 is entered to allow RR ring 84 to send another transmission over the communication path in another time slice for this device. At step 162 if not true, then process 150 enters step 164, described above. Steps 154, 158, and 160, 162, and 166 provide a pathway ("RR loop") for sequential RR transmission within the RR ring 84 for a given transmission cycle provided no GBR requests are present. A device may transfer data until the remainder weight value is exceeded or the device has no additional data to transfer or the transmission cycle is completed.

It is appreciated that in the process 150 described above, the next pointer for both the GBR 82 and the RR 84 rings indicates which device on the ring is next in the specified order. If that device does not have a send request in its specified turn, then the next device is selected. However, if the device has data for transmission, then the data is allowed and the next device is selected.

The two ring approach of the present invention allows devices to be given a guaranteed percentage of bandwidth taken from the top ring, and a distributed piece of the remaining bandwidth if more exists. Devices that can tolerate high latency have their bandwidth counter set to zero and only participate on the remainder ring 84.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. It is intended that the scope of the invention be limited not by this detailed description but by the claims appended hereto.

We claim:

1. In a computer system having a processor and a plurality of devices coupled to communicate over a communication path, a method for providing communication between said devices in a plurality of transmission cycles, said method comprising the steps of:

a) on commencement of each transmission cycle, assigning to individual devices of said plurality of devices a respective programmable number of unused guaranteed time slots within each transmission cycle;

b) within a given transmission cycle, polling individual devices of said plurality of devices in a sequential round robin manner to allow an individual polled device to send a guaranteed bandwidth data burst over said communication media, said step b) comprising the steps of:

b1) provided said individual polled device contains unused guaranteed bandwidth time slices within said given transmission cycle, allowing said individual polled device to send an uninterrupted guaranteed bandwidth data burst over said communication media; and b2) responsive to step b1) decrementing the number of unused guaranteed time slices for said individual polled device; and c) within said given transmission cycle, provided step b) does not utilize all time slots of a given transmission cycle for guaranteed bandwidth transmissions, polling individual devices of said plurality of devices in a sequential round robin manner to allow an individual polled device to send an uninterrupted non-guaranteed data burst over said communication media.

2. A method as described in claim 1 wherein the duration of time consumed by the total number of time slots assigned to said plurality of devices in step a) does not exceed the duration of a given transmission cycle.

3. A method as described in claim 1 wherein the duration of time consumed by the total number of time slots assigned to said plurality of devices in said step a) is less than a duration of a given transmission cycle.

4. A method as described in claim 1 wherein said guaranteed bandwidth data burst sent in step b1) represents real-time multimedia information.

5. In a computer system having a processing unit, a memory, a system controller and a plurality of peripheral devices coupled by a system bus, an apparatus for peer to peer data transmission comprising:

means for defining a selected period of time as the granularity for transmission of data over the system bus;

register means associated with said system controller and each of said peripheral devices for storing a respective programmable bandwidth counter value for each peripheral device;

means for sequentially selecting each of said system controller and said peripheral devices having a bandwidth counter greater than a selected threshold and for establishing a peer-to-peer transmission path for uninterrupted guaranteed transmission of data during said selected period of time;

register means associated with said system controller and each of said peripheral devices for storing a remainder weight value; and means for sequentially selecting said system controller and each of said peripheral devices having a bandwidth counter value less than said selected threshold and having data to be sent and for establishing a peer-to-peer transmission path for uninterrupted non-guaranteed transmission of data for up to a plurality of selected periods of time, where said plurality of selected periods of time correspond to the remainder weight value held in said register means.

6. A computer implemented method for enabling peer-to-peer communications among a plurality of peripherals coupled by a system bus in a computer system, each of said peripherals associated with an assigned sequential identification number, said method comprising the steps of:

allocating the bandwidth of the system bus by defining a plurality of time slots for transmission of data between said peripherals;

loading a respective programmable value, corresponding to a percentage of the allocated time slots, into a register associated with each of said peripherals having a requirement for transmitting data on a timely basis;

sequentially, using a round robin selection, selecting a selected peripheral of said peripherals requesting transmission of data;

determining if said value associated with said selected peripheral is greater than a selected threshold;

transmitting data without interruption for a period of time corresponding to one time slot if said value in the register of the selected peripheral is greater than the selected threshold and decrementing said value in the register associated with said selected peripheral;

repeating said selecting, determining, and transmitting steps until the values in each of said registers is less than the selected threshold or until said plurality of time slots have been used; and reloading said value into each of said registers and repeating said selecting, determining, transmitting, selecting and repeating steps; and loading a second register associated with each of said peripherals with a respective programmable value corresponding to a number of tokens for use in obtaining access to unused time slots in the event said registers associated with said peripherals are less than said selected threshold;

selecting in a sequential round robin manner, peripherals having a value in said second register and transmission requests; and transmitting data to or from said selected peripheral without interruption for a period of time corresponding to a plurality of time slots where said plurality of time slots corresponds to the number of tokens loaded in said second register.

7. The method of claim 6 further comprising the steps of:

decrementing said second register each time said selected peripheral transmits data during each time slot;

terminating said transmission in the event said plurality of transmission slots exceed the number of unused allocated time slots;

terminating said transmission in the event said selected peripheral has no further transmission requirements and repeating said selecting, transmitting, decrementing and terminating steps until said plurality of time slots exceed the number of unused allocated transmission slots.

8. In a computer system having a processing unit coupled by a bus to a plurality of devices capable of exchanging data therebetween, a method of prioritizing the transfer of data comprising the steps of:

a) allowing devices of a first priority ring to communicate, said step a) comprising the steps of:

assigning said devices having real-time data transmissions to said first priority ring, said first priority ring having guaranteed access to a selectable portion of the available bandwidth of said bus;

polling each device assigned to said first priority ring in a sequential round robin fashion to determine whether said polled device has data to transmit;

transmitting said data without interruption from the polled device to a target device; and for each polled device allowed to transmit data, decreasing an associated respective programmable bandwidth allocation for said polled device; and b) provided communication of said devices of said first priority ring is complete, allowing devices of a second priority ring to communicate, said step b) comprising the steps of:

assigning devices having non-real-time data transmissions to said second priority ring having access to the portion of said bandwidth not used by devices assigned to said first priority ring;

polling each device assigned to said second priority ring in a sequential round robin fashion to determine whether said polled device has data to transmit; and transmitting said data without interruption from the polled device to a target device.

9. The method of claim 8 wherein said selectable portion of said bandwidth comprises the entire available bandwidth and the portion of said bandwidth available to said second priority ring is zero unless said devices assigned to said first priority ring have no remaining data to transmit.

* * * * *